July 22, 1941.                J. R. SINK                2,250,038
                            FISHING SINKER
                         Filed March 29, 1940
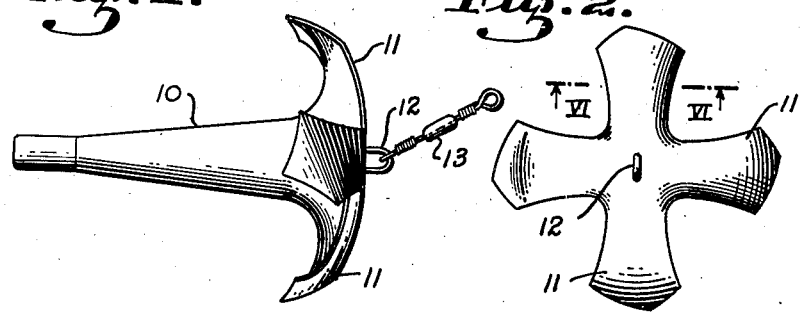
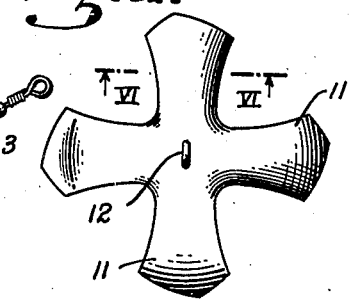
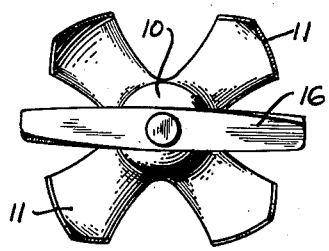
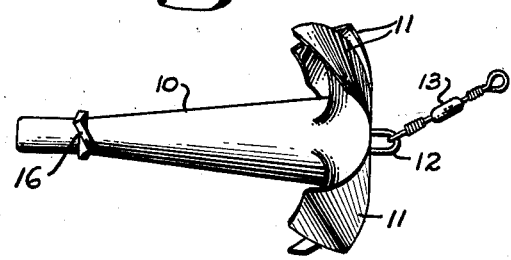
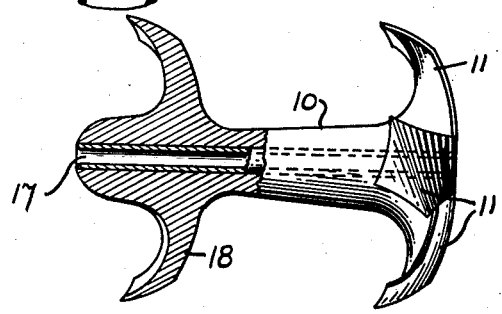
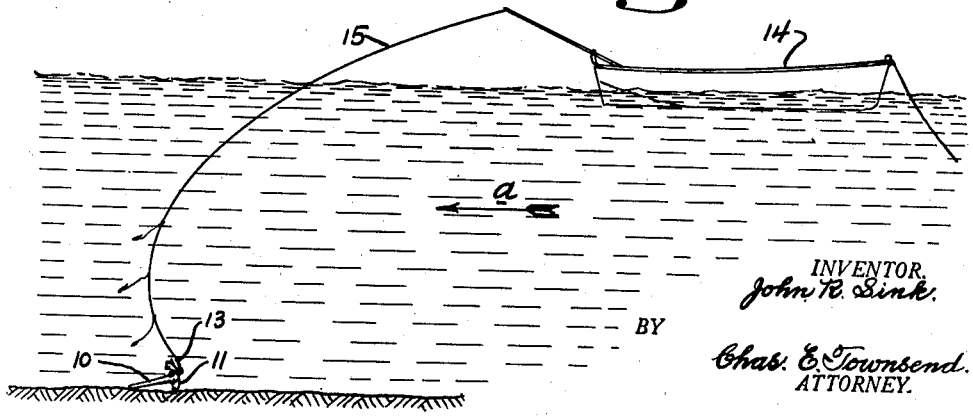
INVENTOR.
John R. Sink.
BY
Chas. E. Townsend.
ATTORNEY.

Patented July 22, 1941

2,250,038

UNITED STATES PATENT OFFICE 2,250,038

FISHING SINKER

John R. Sink, San Francisco, Calif.

Application March 29, 1940, Serial No. 326,633

5 Claims. (Cl. 43—52)

The present invention relates to fishing sinkers, and particularly to sinkers of the anchor type adapted to weight the free end of a line and to engage in the bottom or bed of a body of water to prevent drifting of the line and other fishing tackle, due to currents in the water.

It is the object of the present invention to provide a sinker, the holding capacity of which will be great relative to its size and weight, and to provide a sinker constructed to engage the bottom in a manner to prevent drifting of the line to which it is attached.

A further object is to provide a sinker of a shape which affords resistance to forces tending to move it along the bottom, but which at the same time will move through the water very easily and quickly when it is being raised and lowered.

Further objects and advantages of the invention will be made apparent in the following specification, wherein the invention is described in detail with reference to the accompanying drawing.

In the drawing—

Fig. 1 is a side elevation of a sinker embodying my invention;

Fig. 2 is a front elevation of the sinker shown in Fig. 1;

Fig. 3 is a rear elevation of a modified form of the invention;

Fig. 4 is a side elevation of the form of the invention illustrated in Fig. 3;

Fig. 5 is a side elevation with parts in section of a free line sinker embodying the present invention;

Fig. 6 is a sectional view through one of the flukes of any of the sinkers illustrated in Figs. 1 to 5, as viewed, for example, from the line VI—VI of Fig. 2; and Fig. 7 is a diagrammatic view showing the manner in which the sinkers illustrated in Figs. 1 to 4 are used.

Referring in detail to the drawing, each of the sinkers illustrated in Figs. 1 to 5 is shown as comprising a body member 10, preferably elongated, and having a cross section either circular, as shown, or of any other desired shape. At the forward end of the body member 10 there are integrally formed radially extending flukes 11. These flukes are shown as four in number, but there may be more or less if desired, and as few as two will be suitable for some purposes, although three or more are generally preferred.

The flukes 11, which are preferably slightly broader than they are thick, are twisted or pitched slightly with relation to a plane normal to the body of the sinker, as is indicated by the position of the cross section illustrated in Fig. 6, so that they assume positions similar to the blades of a propeller, causing them to act upon the sinker as it passes through the water at the end of a line to cause it to rotate and thus make its way through the water more easily and with less resistance than if it were pulled directly through the water without rotation.

One of the principal advantages of this feature is that in casting a line, the sinker tends to travel straight to the bottom because of its rotary motion rather than to drift with the current on its way to the bottom. Such drifting is undesirable because it requires more line and consequently subjects more line to the action of the current, which tends to cause movement of the sinker along the bottom.

At its extreme forward end the sinker is provided with a staple 12 of wire or similar material, the main portion of which is let into the body of the sinker when it is cast, and to which is connected a swivel fitting 13 of a type commonly used in connection with fishing tackle. The forward end of the swivel 13 has an eye to which a fishing line may be connected. The swivel 13 makes possible the free rotation of the sinker as it is being let down or drawn out of the water.

The radial flukes 11 curve rearwardly to engage the bottom after the sinker has been let down for the purpose of preventing the sinker from drifting rearwardly. This is an important feature because in fishing it is common to anchor a boat in the manner illustrated in Fig. 7, the boat being shown at 14, with the tide or current of the water moving in the direction of the arrow $a$. Consequently, when the line 15 is cast from the stern of the boat and the sinker rests on the bottom, as illustrated, there is a tendency for the line and sinker to be carried away from the boat; and the shape of the flukes on the sinker of the present invention is such that they engage with the bottom in a manner to prevent the sinker being drawn away from the boat, rather than to prevent it from being drawn back toward the boat by tension on the line 15, as is conventional practice in the construction of sinkers designed for this purpose.

In Fig. 1, the rear end of the body 10 of the sinker is shown as having a cross section similar to that of the body itself, but in some cases it may be desired to enlarge the rear end to provide extra weight. In the form of the invention illustrated in Figs. 3 and 4, the rear end of the sinker is provided with a cross bar 16, which has opposite ends projecting radially outwardly from the body of the sinker and pitched in the manner of the flukes 11 to supplement the tendency of the flukes to cause the sinker to rotate as it is drawn through the water. The bar 16 is preferably arranged at an angle intermediate the position of adjacent flukes, so that when the sinker is let to the bottom, the bar 16 resting normally in a flat position on the bottom will hold the sinker in such a position that two of its flukes will engage the bottom simultaneously, and the sinker will have a three-point support, one point being at the rear end of the sinker, and the other two being the engagement of two adjacent flukes in the bottom. This positioning of the sinker, which is brought about by the arrangement of the bar 16, tends to prevent it from drifting to one side or the other in case the tide or current is not directly in line with the body of the sinker. The length of the bar 16 also prevents rolling of the sinker to one side or the other while it is on the bottom.

Referring to Fig. 5 of the drawing, the invention is illustrated as adapted to a free line sinker or the type of sinker through which a fishing line may slide so that the sinker will hold the line on the bottom at a point intermediate its ends while bait hooks on the free end may drift with the current. In this form of the invention, the body 10 is cast about a concentrically positioned tube 17 through which the fishing line is passed, and the rear end of the sinker is provided with flukes 18 similar in construction and arrangement to the flukes 11 at its forward end, so that both sets of flukes will engage the bottom and maintain the body in a substantially horizontal position, with the line passing through the tube 17 supported in a position clear of the bottom.

The body and flukes of the sinker are in all cases preferably made of a heavy material, such, for example, as lead or the like; and the fittings are formed of any suitable corrosion resistant metal.

While the invention has been described more or less in detail for purposes of illustration, it is of course to be understood that various changes may be resorted to in the construction and arrangement of its several parts, all within the scope of the appended claims.

Having thus described my invention, what I claim and desire to secure by Letters Patent is—

1. A fishing sinker comprising a body member, radial flukes disposed at the forward end thereof and terminating in rearwardly directed points, and means for connecting a line to the forward end whereby said flukes will tend to resist drifting of the sinker and line away from the point to which the line is secured.

2. A fishing sinker comprising an elongated body member, flukes projecting radially therefrom, and means for attaching a line to the body member to raise and lower the sinker through the water in the direction of its length, said flukes being pitched to impart rotation to the sinker as it is drawn through the water.

3. A fishing sinker comprising a body member, means for attaching a line to the forward end thereof, a plurality of flukes projecting radially from the forward end of the body member, and a cross bar adjacent the rear of the body member to rest on the bottom and position two of the flukes for engagement in the bottom.

4. A fishing sinker comprising a body member, means for attaching a line to the forward end thereof, a plurality of flukes projecting radially from the forward end of the body member, and a cross bar adjacent the rear of the body member to rest on the bottom and position two of the flukes for engagement in the bottom, said flukes and cross bar being pitched to cause the sinker to rotate as it is drawn through the water by said line.

5. A free-line sinker comprising an elongated body member with a tube extending lengthwise therethrough for sliding reception of a fishing line, and flukes extending radially from the body at both its ends and inclined rearwardly at their outer ends.

JOHN R. SINK.